United States Patent
Fukazawa

(10) Patent No.: US 11,261,090 B2
(45) Date of Patent: Mar. 1, 2022

(54) METHOD FOR PRODUCING LITHIUM COBALT PHOSPHATE AND METHOD FOR PRODUCING LITHIUM COBALT PHOSPHATE-CARBON COMPOSITE

(71) Applicant: Nippon Chemical Industrial Co., Ltd., Tokyo (JP)

(72) Inventor: Junya Fukazawa, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 17/253,780

(22) PCT Filed: Jun. 27, 2019

(86) PCT No.: PCT/JP2019/025586
§ 371 (c)(1),
(2) Date: Dec. 18, 2020

(87) PCT Pub. No.: WO2020/012970
PCT Pub. Date: Jan. 16, 2020

(65) Prior Publication Data
US 2021/0253426 A1    Aug. 19, 2021

(30) Foreign Application Priority Data

Jul. 10, 2018 (JP) .............................. JP2018-130663
Jan. 25, 2019 (JP) .............................. JP2019-010864

(51) Int. Cl.
*C01B 25/45* (2006.01)

(52) U.S. Cl.
CPC .......... *C01B 25/45* (2013.01); *C01P 2002/74* (2013.01); *C01P 2004/61* (2013.01); *C01P 2004/62* (2013.01); *C01P 2006/12* (2013.01)

(58) Field of Classification Search
CPC .. C01B 25/45; C01P 2002/74; C01P 2004/61; C01P 2004/62; C01P 2006/12
See application file for complete search history.

(56) References Cited

U.S. PATENT DOCUMENTS

| | | | | |
|---|---|---|---|---|
| 3,855,016 A | * | 12/1974 | Ehrreich | ................. H01F 1/061 148/311 |
| 2005/0196334 A1 | * | 9/2005 | Saidi | ...................... C01B 25/45 423/306 |
| 2011/0274975 A1 | * | 11/2011 | Kashiwa | ............. H01M 4/5825 429/221 |
| 2015/0118560 A1 | * | 4/2015 | Ewald | ................. H01M 4/5825 429/221 |

FOREIGN PATENT DOCUMENTS

| | | | |
|---|---|---|---|
| JP | 9-134724 A | 5/1997 | |
| JP | 2003-157843 A | 5/2003 | |
| JP | 2009-286669 A | 12/2009 | |
| JP | 2009-289726 | * 12/2009 | ............. H01M 4/52 |
| JP | 2014-53240 A | 3/2014 | |
| JP | 2015-88266 A | 5/2015 | |
| JP | 2015-170464 A | 9/2015 | |

OTHER PUBLICATIONS

JP 2009-289726 Espacenet Abstract Dec. 10, 2009.*
JP 2009-289726 Espacenet English Machine Translateion Dec. 10, 2009.*
ChemicalAid ( © 2008-2021—considered as Dec. 31, 2008 printed Aug. 22, 2021)({https://en.intl.chemicalaid.com/tools/equationbalancer.php?equation=H3PO4+%2B+LiOH+%3D+H2O+%2B+Li3PO4}.*
International Search Report dated Aug. 27, 2019, issued in counterpart International Application No. PCT/JP2019/025586, with English Translation. (6 pages).
Written Opinion of the International Searching Authority (Forms PCT/ISA/237) dated Aug. 27, 2019, issued in counterpart International Application No. PCT/JP2019/025586 (4 pages).

* cited by examiner

*Primary Examiner* — Cynthia H Kelly
*Assistant Examiner* — Aaron J Greso
(74) *Attorney, Agent, or Firm* — Westerman, Hattori, Daniels and Adrian, LLP

(57) ABSTRACT

Provided is a method for producing a lithium cobalt phosphate represented by the following general formula (1): $Li_xCo_{1-y}M_yPO_4$ (1), wherein $0.8 \leq x \leq 1.2$ and $0 \leq y \leq 0.5$, and M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy, and Ho; the method comprising: a first step of adding an organic acid and cobalt hydroxide to a water solvent, and then adding phosphoric acid and lithium hydroxide thereto to prepare an aqueous raw material slurry (1); a second step of wet-pulverizing the aqueous raw material slurry (1) with a media mill to obtain a slurry (2) containing a pulverized product of raw materials; a third step of spray-drying the slurry (2) containing the pulverized product of raw materials to obtain a reaction precursor; and a fourth step of firing the reaction precursor. According to the present invention, a single-phase lithium cobalt phosphate in X-ray diffraction analysis can be obtained by an industrially advantageous method.

10 Claims, 4 Drawing Sheets

[Figure 1]
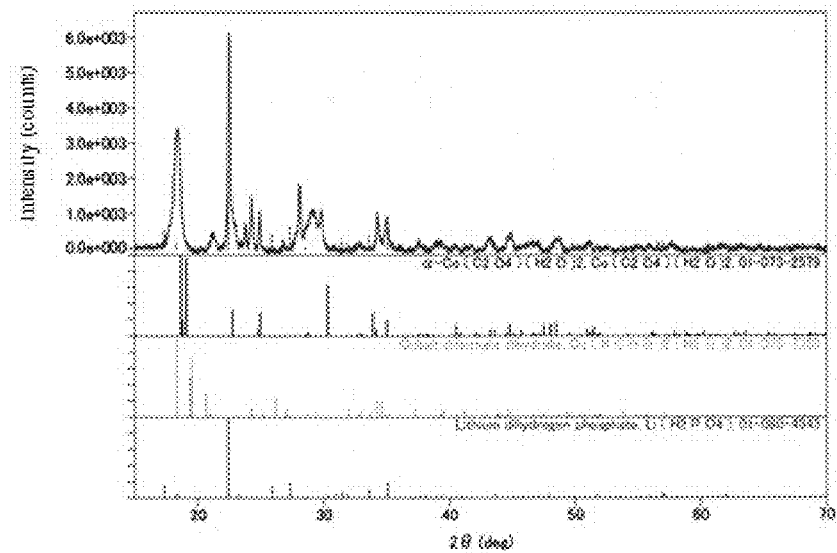
[Figure 2]
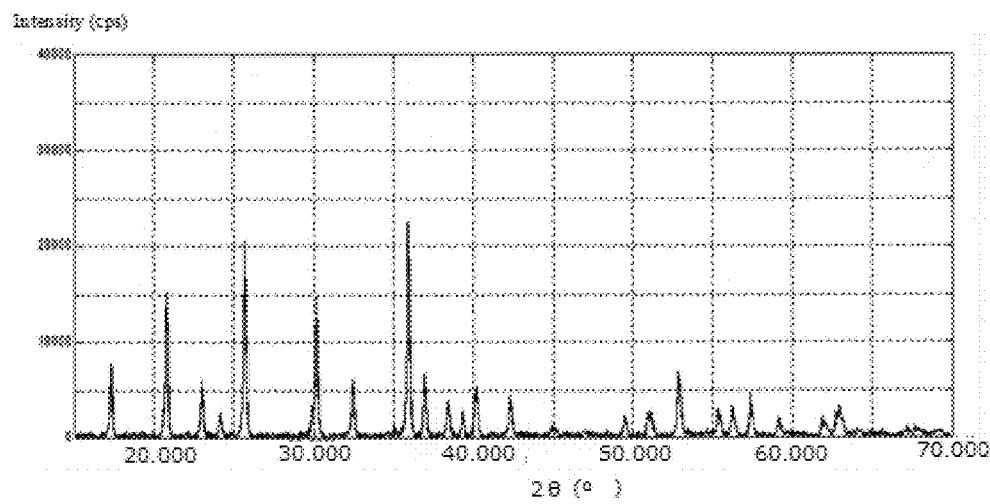

[Figure 3]
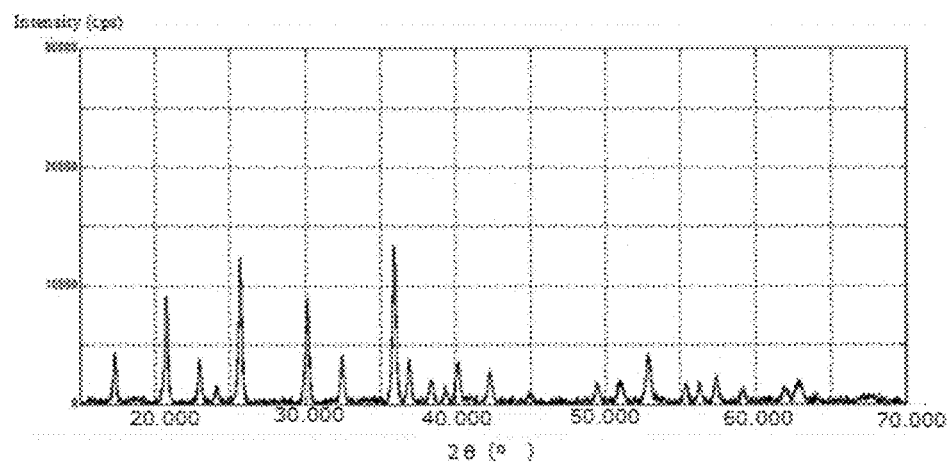
[Figure 4]
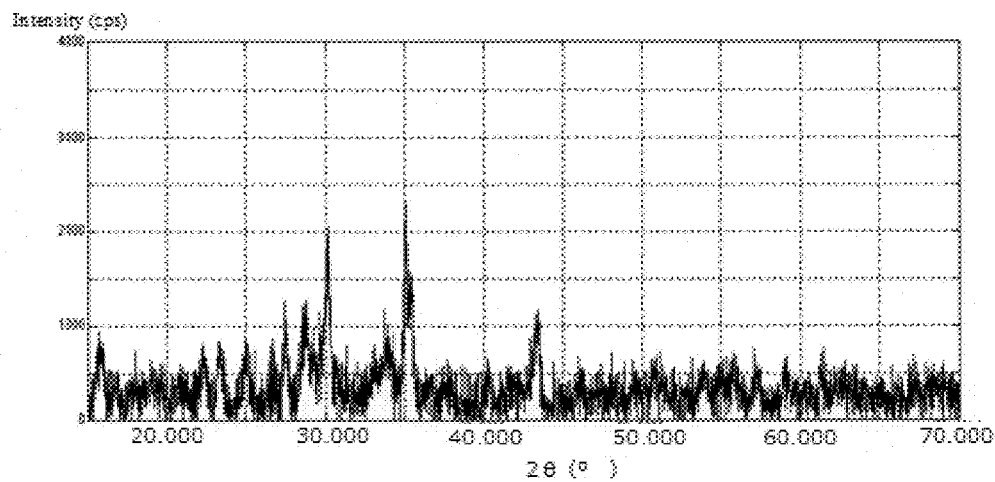

[Figure 5]
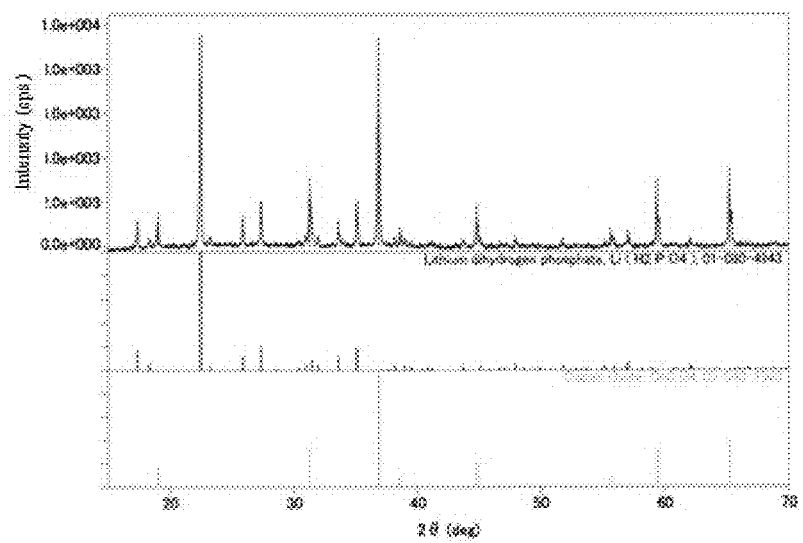
[Figure 6]
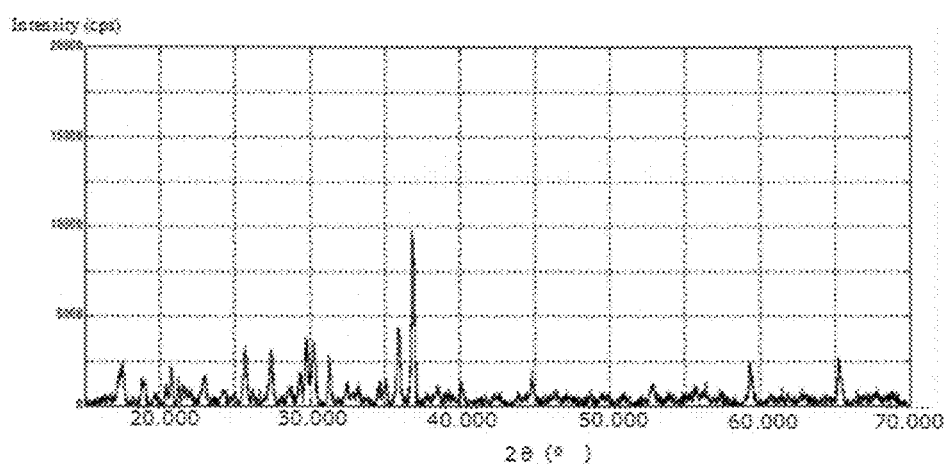

[Figure 7]
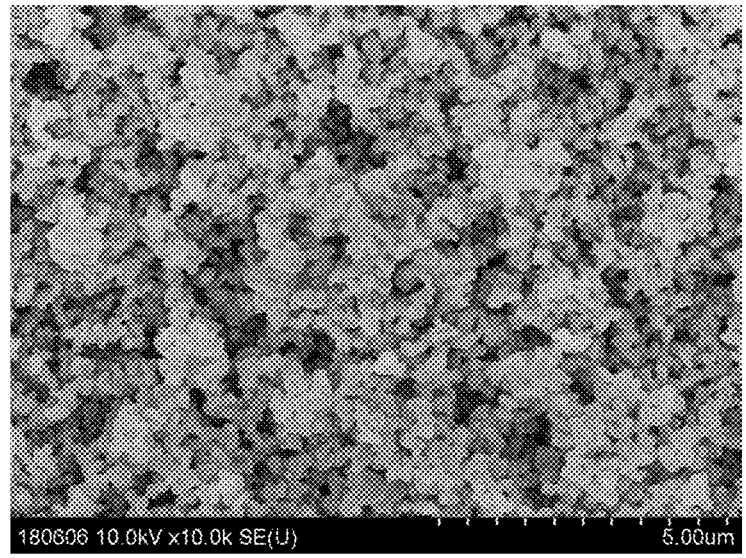
[Figure 8]
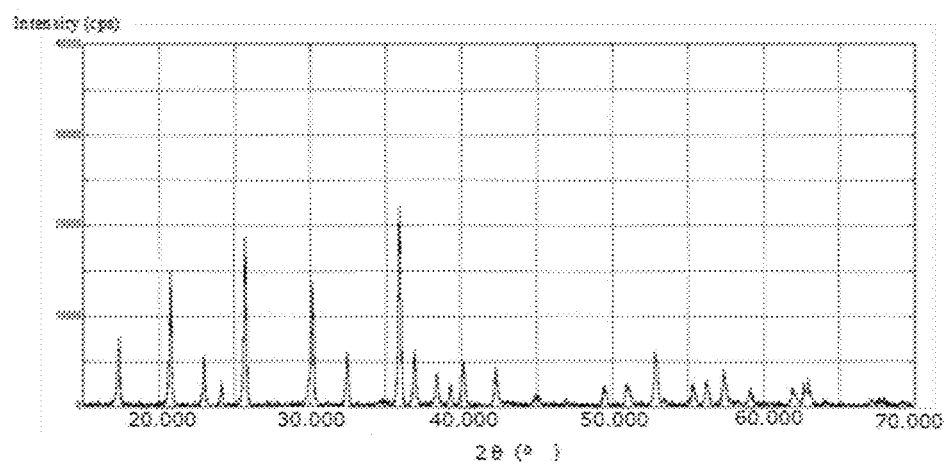

METHOD FOR PRODUCING LITHIUM COBALT PHOSPHATE AND METHOD FOR PRODUCING LITHIUM COBALT PHOSPHATE-CARBON COMPOSITE

TECHNICAL FIELD

The present invention relates to a method for producing a lithium cobalt phosphate useful as a positive electrode material for lithium secondary batteries, all-solid-state batteries, etc., and a method for producing a lithium cobalt phosphate-carbon composite.

BACKGROUND ART

Lithium-ion batteries are used as batteries for portable appliances and laptops. Lithium ion batteries are generally considered to be excellent in capacity and energy density. Use for hybrid vehicles and electric vehicles is also expected. In the case of use for automobiles, lithium ion secondary batteries are subjected to harsher conditions of temperature and charge/discharge current than conventional ones.

Olivine-type phosphates such as a lithium cobalt phosphate ($LiCoPO_4$) release no oxygen even at a high temperature due to the strong structure thereof, so that use as a positive electrode active material of lithium secondary batteries, all-solid-state batteries, etc., of automobiles has attracted attention due to the enhanced safety.

As a method for producing a lithium cobalt phosphate, for example, in Patent Literature 1, a method including the steps of dry-mixing lithium carbonate, cobalt trioxide, and phosphorus pentoxide and firing the mixture at 780° C. in the air atmosphere is proposed. Also, in Patent Literature 2, a method including the successive steps of adding lithium acetate, cobalt acetate and ammonium hydrogen phosphate to water, adjusting the pH of the mixture solution to 1.5 or less with concentrated nitric acid, adding glycolic acid thereto as a chelating agent for suppressing particle growth, removing the solvent to obtain a precursor by drying, and firing the precursor at 600° C. in an argon atmosphere is proposed. Further, in Patent Literature 3, a method including the successive steps of dissolving lithium hydroxide and ammonium hydrogen phosphate in water bubbled with $N_2$, adding an aqueous solution dissolving cobalt sulfate thereto to obtain a mixed solution, removing the solvent to obtain a precursor, and firing the precursor at 600° C. in a nitrogen atmosphere is proposed.

CITATION LIST

Patent Literature

Patent Literature 1: Japanese Patent Laid-Open No. 9-134724, Paragraph 0008
Patent Literature 2: Japanese Patent Laid-Open No. 2015-88266, Paragraph 0044
Patent Literature 3: Japanese Patent Laid-Open No. 2015-170464, Paragraph 0066

SUMMARY OF INVENTION

Technical Problem

Although a lithium cobalt phosphate has attracted attention as a safe positive electrode active material, it is difficult to obtain a single-phase lithium cobalt phosphate in X-ray diffraction analysis by the method including dry-mixing each raw material as in Patent Literature 1. Further, in the methods in Patent Literature 1 to 3, firing at a high temperature of 600° C. or more is required to obtain a single-phase lithium cobalt phosphate in X-ray diffraction analysis, which is not industrially advantageous. Accordingly, to provide a lithium cobalt phosphate by a more industrially advantageous method is desired.

An object of the present invention is therefore to provide a method for producing a single-phase lithium cobalt phosphate in X-ray diffraction analysis by an industrially advantageous method. Another object of the present invention is to provide a method for producing a composite of the lithium cobalt phosphate and carbon.

Solution to Problem

In view of the circumstances described above, the present inventors have performed intensive studies to find the following. In a method of preparing a raw material mixture in a wet process from at least cobalt hydroxide, phosphoric acid and lithium hydroxide as raw materials, the raw material mixture is prepared in the presence of an organic acid with consideration of the sequence of addition of the raw materials, so that each raw material is uniformly dispersed to obtain an aqueous raw material slurry having easy handleability. Also, the aqueous raw material slurry can be subjected to wet pulverization by a media mill. Further, a slurry containing the pulverized product obtained by wet-pulverizing the aqueous raw material slurry is spray-dried to obtain a reaction precursor, from which a single-phase lithium cobalt phosphate in X-ray diffraction analysis, excellent in reactivity, can be produced by firing even at a lower temperature than conventional methods. The present invention has been thus completed.

In other words, a present invention (1) provides a method for producing a lithium cobalt phosphate represented by the following general formula (1):

$$Li_xCo_{1-y}M_yPO_4 \qquad (1)$$

wherein 0.8≤x≤1.2 and 0≤y≤0.5, and M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy, and Ho;

the method comprising:
a first step of adding an organic acid and cobalt hydroxide to a water solvent, and then adding phosphoric acid and lithium hydroxide thereto to prepare an aqueous raw material slurry (1);
a second step of wet-pulverizing the aqueous raw material slurry (1) with a media mill to obtain a slurry (2) containing a pulverized product of raw materials;
a third step of spray-drying the slurry (2) containing the pulverized product of raw materials to obtain a reaction precursor; and
a fourth step of firing the reaction precursor.

Also, a present invention (2) provides the method for producing a lithium cobalt phosphate according to the present invention (1) further comprising adding an M source to the aqueous raw material slurry (1) in the first step or the slurry (2) containing the pulverized product of raw materials in the second step, wherein M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy and Ho.

Also, a present invention (3) provides the method for producing a lithium cobalt phosphate according to the present invention (1) or (2), wherein the solid in the slurry (2) containing the pulverized product of raw materials has an average particle size of 1.5 μm or less.

Also, a present invention (4) provides the method for producing a lithium cobalt phosphate according to any one of the present inventions (1) to (3), wherein the organic acid is a carboxylic acid.

Also, a present invention (5) provides the method for producing a lithium cobalt phosphate according to any one of the present inventions (1) to (3), wherein the organic acid is oxalic acid.

Also, a present invention (6) provides the method for producing a lithium cobalt phosphate according to any one of the present inventions (1) to (5), wherein the reaction precursor contains an organic acid salt of cobalt and a phosphate of lithium.

Also, a present invention (7) provides the method for producing a lithium cobalt phosphate according to any one of v (1) to (6), wherein a firing temperature is 380 to 1100° C.

Also, a present invention (8) provides the method for producing a lithium cobalt phosphate according to any one of the present inventions (1) to (7), further comprising a fifth step (A) of heat-treating the lithium cobalt phosphate obtained by the fourth step.

Also, a present invention (9) provides a method for producing a lithium cobalt phosphate-carbon composite comprising a fifth step (B) comprising mixing the lithium cobalt phosphate obtained by the method for producing a lithium cobalt phosphate according any one of the present inventions (1) to (7) with a conductive carbon material source that is thermally decomposed to precipitate carbon to obtain a mixture of the lithium cobalt phosphate and the conductive carbon material source, and then heat-treating the mixture for thermal decomposition of the conductive carbon material source to obtain a lithium cobalt phosphate-carbon composite.

Also, a present invention (10) provides the method for producing a lithium cobalt phosphate-carbon composite according to the present invention (9), wherein a heat treatment temperature of the heat-treatment in the fifth step (B) is 180 to 900° C.

Advantageous Effect of Invention

According to the method for producing a lithium cobalt phosphate of the present invention, a single-phase lithium cobalt phosphate in X-ray diffraction analysis is able to be obtained by firing even at a temperature less than 600° C., so that a lithium cobalt phosphate useful as a positive electrode material for lithium secondary batteries, all-solid-state batteries, etc., can be provided in an industrially advantageous manner. Also, according to the present invention, a method for producing a composite of the lithium cobalt phosphate and carbon can be provided.

BRIEF DESCRIPTION OF DRAWINGS

FIG. 1 is an X-ray diffraction diagram of the reaction precursor obtained in the third step in Example 1.
FIG. 2 is an X-ray diffraction diagram of a lithium cobalt phosphate obtained in Example 1.

FIG. 3 is an X-ray diffraction diagram of a lithium cobalt phosphate obtained in Example 2.
FIG. 4 is an X-ray diffraction diagram of a solid obtained in Comparative Example 1.
FIG. 5 is an X-ray diffraction diagram of a reaction precursor obtained in Comparative Example 2.
FIG. 6 is an X-ray diffraction diagram of a fired product obtained in Comparative Example 2.
FIG. 7 is an SEM photograph of a lithium cobalt phosphate obtained in Example 1.
FIG. 8 is an X-ray diffraction diagram of a lithium cobalt phosphate obtained in Example 6.

DESCRIPTION OF EMBODIMENTS

The method for producing a lithium cobalt phosphate of the present invention is a method for producing a lithium cobalt phosphate represented by the following general formula (1):

$$Li_xCo_{1-y}M_yPO_4 \quad (1)$$

wherein 0.8≤x≤1.2 and 0≤y≤0.5, and M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy, and Ho;

the method comprising:

a first step of adding an organic acid and cobalt hydroxide to a water solvent, and then adding phosphoric acid and lithium hydroxide thereto to prepare an aqueous raw material slurry (1);

a second step of wet-pulverizing the aqueous raw material slurry (1) with a media mill to obtain a slurry (2) containing a pulverized product of raw materials;

a third step of spray-drying the slurry (2) containing the pulverized product of raw materials to obtain a reaction precursor; and a fourth step of firing the reaction precursor.

The lithium cobalt phosphate obtained by the method for producing a lithium cobalt phosphate of the present invention is a lithium cobalt phosphate having an Olivine structure, represented by the following general formula (1):

$$Li_xCo_{1-y}M_yPO_4 \quad (1)$$

wherein 0.8≤x≤1.2 and 0≤y≤0.5, and M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy, and Ho.

In the general formula (1), x is 0.8 or more and 1.2 or less, preferably 0.9 or more and 1.1 or less, and y is 0 or more and 0.5 or less, preferably 0 or more and 0.4 or less. M is a metal element that is added on an as needed basis for the purpose of improving battery characteristics. M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy and Ho, being preferably one or two or more selected from the group consisting of Fe, Ni and Mn.

The first step of the method for producing a lithium cobalt phosphate of the present invention is a step of adding an organic acid and cobalt hydroxide to a water solvent, and then adding phosphoric acid and lithium hydroxide thereto to prepare an aqueous raw material slurry (1).

Addition of cobalt hydroxide, phosphoric acid and lithium hydroxide to a water solvent makes a slurry in a cake state, which is hardly stirred. The present inventors have found that by adding an organic acid and cobalt hydroxide to a water solvent, and then adding phosphoric acid and lithium hydroxide thereto, each raw material is uniformly dispersed, so that an aqueous raw material slurry (1) having easy handleability can be obtained. It has been also found that the aqueous raw material slurry (1) is able to be wet-pulverized by a media mill.

In the first step, first, an organic acid and cobalt hydroxide are added to a water solvent, so that cobalt hydroxide reacts with the organic acid to form an organic acid salt of cobalt. Next, phosphoric acid and lithium hydroxide are added to an aqueous slurry (A) containing the organic acid salt of cobalt, so that phosphoric acid and lithium hydroxide are further reacted to form a phosphate of lithium. The aqueous raw material slurry (1) obtained by the first step, therefore, contains at least an organic acid salt of cobalt and a phosphate of lithium.

Examples of the organic acid in the first step include a monocarboxylic acid such as formic acid, acetic acid, glycolic acid, lactic acid and gluconic acid, a dicarboxylic acid such as oxalic acid, maleic acid, malonic acid, malic acid, tartaric acid and succinic acid, and a carboxylic acid having 3 carboxylic groups such as citric acid. Among these, oxalic acid is preferred as the organic acid due to excellence in the reactivity with cobalt hydroxide.

The amount of the organic acid added is such that the molar ratio of carbon atoms in the organic acid to cobalt atoms in cobalt hydroxide (C/Co) is controlled to 1.5 or more. With a molar ratio of carbon atoms in the organic acid to cobalt atoms in cobalt hydroxide (C/Co) below the range, $Co_3(PO_4)_2 \cdot 8H_2O$ is produced to make a slurry in a cake state, so that stirring tends to be difficult. Also, from the viewpoint of stabilizing the viscosity of the slurry, the amount of the organic acid added is such that the molar ratio of carbon atoms in the organic acid to cobalt atoms in cobalt hydroxide (C/Co) is controlled to preferably 1.5 to 2.5, particularly preferably 1.7 to 2.3.

The amount of cobalt hydroxide added to the water solvent is 5 to 30 parts by mass, preferably 7 to 25 parts by mass, per 100 parts by mass of the water solvent. With an amount of cobalt hydroxide added to the water solvent in the range, the viscosity of the slurry is stabilized.

After addition of the organic acid and cobalt hydroxide to a water solvent, it is preferable that the mixture be stirred at 15 to 90° C., preferably 20 to 80° C., for 30 minutes or more, preferably 30 minutes to 2 hours to cause a reaction between the organic acid and cobalt hydroxide. Through the reaction between the organic acid and cobalt hydroxide, an aqueous slurry (A) containing at least an organic acid salt of cobalt can be obtained.

In the preparation of the aqueous slurry (A) containing an organic acid salt of cobalt, although the sequence of addition of the organic acid and cobalt hydroxide is not particularly limited, it is preferable that the organic acid be added to a water solvent and then cobalt hydroxide be added thereto, from the viewpoint of stabilizing the viscosity of the slurry.

In the first step, phosphoric acid and lithium hydroxide are then added to the aqueous slurry (A) containing an organic acid salt of cobalt.

The amount of phosphoric acid added to the aqueous slurry (A) containing an organic acid salt of cobalt is such that the molar ratio of cobalt atoms in the aqueous slurry (A) to phosphorus atoms in phosphoric acid (Co/P) is controlled to preferably 0.7 to 1.3, particularly preferably 0.8 to 1.2. With a molar ratio of cobalt atoms in the aqueous slurry (A) to phosphorus atoms in phosphoric acid (Co/P) in the range, a single-phase lithium cobalt phosphate in X-ray diffraction analysis tends to be easily obtained.

The amount of lithium hydroxide added to the aqueous slurry (A) containing an organic acid salt of cobalt is such that the molar ratio of lithium atoms in lithium hydroxide to phosphorus atoms in phosphoric acid (Li/P) is controlled to preferably 0.7 to 1.3, particularly preferably 0.8 to 1.2. With a molar ratio of lithium atoms in lithium hydroxide to phosphorus atoms in phosphoric acid (Li/P) in the range, a single-phase lithium cobalt phosphate in X-ray diffraction analysis tends to be easily obtained.

In the first step, phosphoric acid and lithium hydroxide are added to the aqueous slurry (A) containing an organic acid salt of cobalt to cause a reaction between phosphoric acid and lithium hydroxide, so that a phosphate of lithium is produced. It is preferable that the aqueous raw material slurry (1) in the first step contain a phosphate of lithium. In the first step, it is preferable that stirring be performed at 15 to 90° C., preferably 20 to 80° C., for 30 minutes or more, preferably 30 minutes to 2 hours, to cause a reaction between phosphoric acid and lithium hydroxide.

In the preparation of the aqueous raw material slurry (1) from the aqueous slurry (A) containing an organic acid salt of cobalt, although the sequence of addition of phosphoric acid and lithium hydroxide to the aqueous slurry (A) containing an organic acid salt of cobalt is not particularly limited, it is preferable that phosphoric acid be added to the aqueous slurry (A) containing an organic acid salt of cobalt and then lithium hydroxide be added thereto, from the viewpoint of stabilizing the viscosity of the slurry with the pH of the slurry maintained on the acidic side.

The aqueous raw material slurry (1) is thus obtained in the first step, and in the method for producing a lithium cobalt phosphate in the present invention, an M source may be further added to the aqueous raw material slurry (1) in the first step on an as needed basis, wherein M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy and Ho.

Examples of the M source include an oxide, a hydroxide, a carbonate, an organic acid salt, a nitrate, and a phosphate containing an M element.

The amount of the M source added is such that the molar ratio of M atoms in the M source to the total molar ratio of cobalt atoms in cobalt hydroxide and M atoms in the M source (M/(M+Co) is controlled to preferably 0.7 to 1.3, particularly preferably 0.8 to 1.2. With a molar ratio of M atoms in the M source to the total molar ratio of cobalt atoms in cobalt hydroxide and M atoms in the M source (M/(M+Co) in the range, a single-phase lithium cobalt phosphate in X-ray diffraction analysis tends to be easily obtained.

The timing of addition of the M source in the first step is not particularly limited, and at any timing before the second step, the M source may be added so as to be contained in the aqueous raw material slurry (1).

In the method for producing a lithium cobalt phosphate in the present invention, by adding an organic acid and cobalt hydroxide to a water solvent, and then adding phosphoric acid and lithium hydroxide thereto in the first step, each raw material is uniformly dispersed, so that an aqueous raw material slurry (1) having easy handleability capable of being wet-pulverized by a media mill can be obtained.

The second step of the method for producing a lithium cobalt phosphate of the present invention is a step of wet-pulverizing the aqueous raw material slurry (1) obtained by the first step with a media mill to obtain a slurry (2) containing a pulverized product.

In the second step, the solid content concentration in the aqueous raw material slurry (1) during wet pulverization with a media mill is 5 to 40 mass %, particularly preferably 10 to 35 mass %. With a solid content concentration in the aqueous raw material slurry (1) during wet pulverization with a media mill in the range, pulverization can be efficiently performed with good operability. For this reason, it is preferable that, after the first step, the wet pulverization be performed in the second step after adjustment of the solid content concentration of the aqueous raw material slurry (1) to the solid content concentration described above on an as needed basis.

In the second step, the aqueous raw material slurry (1) is wet-pulverized by a media mill. In the second step, through the wet pulverization of the aqueous raw material slurry (1) with a media mill, the solid contained in the aqueous raw material slurry can be finely pulverized, so that a reaction precursor excellent in reactivity can be obtained. Examples of the media mill include a bead mill, a ball mill, a paint shaker, an attritor, and a sand mill, and a bead mill is preferred. In the case of using a bead mill, the operating conditions and the type and size of the bead are appropriately selected according to the size and the throughput of the apparatus.

From the viewpoint of further efficiently performing the treatment using a media mill, a dispersant may be added to the aqueous slurry (A) or the aqueous raw material slurry (1) containing an organic acid salt of cobalt. The dispersant is appropriately selected according to the type and characteristics of the slurry. Examples of the dispersant include various surfactants and ammonium polycarboxylate. The concentration of the dispersant in the slurry is preferably from 0.01 to 10 mass %, particularly preferably from 0.1 to 5 mass %, from the viewpoint of obtaining a sufficient dispersing effect.

In the second step, the wet pulverization using a media mill is performed until the average particle size of the solid in the slurry (2) containing a pulverized product as D50 determined by laser scattering/diffraction reaches preferably 1.5 μm or less, particularly preferably from 0.1 to 1.2 μm. With an average particle size of the solid in the slurry (2) containing a pulverized product in the range, a reaction precursor excellent in reactivity tends to be easily obtained. Incidentally, the D50 determined by the laser scattering/diffraction refers to, for example, a particle size at 50% in a particle size distribution curve determined by a laser scattering/diffraction using MT3300 manufactured by Microtrack Bell.

The slurry (2) containing a pulverized product can thus be obtained in the second step, and in the method for producing a lithium cobalt phosphate of the present invention, an M source may be further added to the slurry containing a pulverized product in the second step on an as needed basis. Incidentally, the type of the M source and the amount of the M source added in the second step are the same as the type of the M source and the amount of the M source added in the first step.

The timing of addition of the M source in the second step is not particularly limited, and at any timing before the third step, the M source may be added so as to be contained in the aqueous slurry (2) containing a pulverized product.

The third step of the method for producing a lithium cobalt phosphate of the present invention is a step of spray-drying the slurry (2) containing a pulverized product obtained in the second step to obtain a reaction precursor.

Although methods other than spray-drying are also known for slurry drying, in the method for producing a lithium cobalt phosphate of the present invention, based on the finding that choice of spray-drying is advantageous, the drying method is employed.

Specifically, in the case of drying by spray-drying, a granulated product uniformly containing the respective raw material components, with raw material particles densely packed, is obtained. Accordingly, in the method for producing a lithium cobalt phosphate of the present invention, using the granulated product as a reaction precursor, a single-phase lithium cobalt phosphate in X-ray diffraction analysis can be obtained by firing the reaction precursor in a fourth step described below.

In the spray-drying in the third step, the reaction precursor is obtained by atomizing the slurry by a predetermined means and drying fine droplets generated thereby. Examples of the atomization process of the slurry include a method using a rotating disk and a method using a pressure nozzle. In the third step, any of the methods may be used.

In the spray-drying in the third step, the relationship between the size of the droplet of the atomized slurry and the size of the particles of the pulverized product contained therein affects the stable drying and the characteristics of the dried powder. Specifically, with a too small size of the raw material particles of the pulverized product relative to the size of the droplet, the droplet becomes unstable, so that it is difficult to properly perform drying. From this viewpoint, the size of the atomized droplet is preferably 1 to 50 μm, particularly preferably 10 to 40 μm. It is preferable that the amount of the slurry supplied to a spray-drying apparatus be determined in consideration of the viewpoint.

The reaction precursor obtained by the spray-drying in the third step is fired in the fourth step, and the powder characteristics such as the average particle size of the lithium cobalt phosphate thus obtained are generally similar to the characteristics of the reaction precursor. For this reason, in the spray-drying in the third step, from the viewpoint of controlling the particle size of the target lithium cobalt phosphate, the spray-drying is performed such that the size of the secondary particles of the reaction precursor determined by scanning electron microscope (SEM) observation is controlled to preferably 1 to 50 μm, particularly preferably 10 to 40 μm.

In the third step, it is preferable that the drying temperature in the spray-drying apparatus be adjusted to 150 to 350° C., preferably 200 to 330° C., at a hot air inlet, and 80 to 200° C., preferably 100 to 170° C., at a hot air outlet, so that the powder is prevented from absorbing moisture and easy collection of the powder is achieved.

The reaction precursor obtained in the third step preferably contains at least an organic acid salt of cobalt and a phosphate of lithium. Through X-ray diffraction analysis of the reaction precursor, the organic acid salt of cobalt and the phosphate of lithium in the reaction precursor can be identified. The lithium phosphate contained in the reaction precursor is preferably $Li(H_2PO_4)$, and the organic acid salt of cobalt varies depending on the type of organic acid used. In the case of using oxalic acid, examples of the organic acid salt of cobalt include an oxalate of cobalt $(Co(C_2O_4)(H_2O)_2)$. Also, as long as the effects of the present invention are not impaired, the organic acid salt of cobalt by-produced in a reaction process may be contained. In the case of using oxalic acid, examples of the organic acid salt of cobalt by-produced include a formate of cobalt ($Co(HCOO)_2(H_2O)_2$). Further, the reaction precursor containing an M source may be a double salt of an organic acid with cobalt and M.

Thus, by performing the third step, a reaction precursor to be fired in the fourth step is obtained.

The fourth step of the method for producing a lithium cobalt phosphate in the present invention is a step of firing the reaction precursor obtained in the third step to obtain a single-phase lithium cobalt phosphate in X-ray analysis.

The firing temperature in the fourth step is 380 to 1100° C., preferably 400 to 1000° C. With a firing temperature below the range, the firing time until a single phase in X-ray diffraction analysis is obtained becomes longer, which is industrially disadvantageous. On the other hand, with a firing temperature above the range, the lithium cobalt phosphate makes a hard sintered body, which is not preferred. Incidentally, in the method for producing a lithium cobalt phosphate of the present invention, it is particularly preferred to perform firing at 400 to 590° C., from the viewpoint that a single-phase lithium cobalt phosphate in X-ray analysis can be obtained even by firing at a lower temperature than conventional one.

The firing atmosphere in the fourth step is an air atmosphere or an inert gas atmosphere. In the case of using an M source that needs to prevent oxidation during firing in the fourth step, it is preferable that the firing atmosphere be an inert gas atmosphere or a reducing atmosphere.

The firing time in the fourth step is not particularly limited, being 0.5 hours or more, preferably 2 to 20 hours. In the fourth step, as long as firing is performed for 0.5 hours or more, preferably 2 to 20 hours, a single-phase lithium cobalt phosphate in X-ray diffraction analysis can be obtained.

In the fourth step, the lithium cobalt phosphate obtained by firing once may be fired a plurality of times on an as needed basis.

The lithium cobalt phosphate obtained in the fourth step may be subjected to a crushing treatment or a pulverizing treatment on an as needed basis, and may be then classified.

In the method for producing a lithium cobalt phosphate of the present invention, the lithium cobalt phosphate obtained in the fourth step may be subjected to the following fifth step (A) or fifth step (B) on an as needed basis.

The fifth step (A) is a step of further heat-treating the lithium cobalt phosphate obtained by the fourth step to control the amount of carbon contained in the lithium cobalt phosphate. Specifically, in the fifth step (A), the lithium cobalt phosphate obtained in the fourth step is subjected to a heat treatment to oxidize carbon in the lithium cobalt phosphate. The heat treatment in the fifth step (A) is preferably performed in an oxygen-containing atmosphere. In the fifth step (A), it is preferable that the oxygen concentration in the atmosphere be 5 vol. % or more, preferably 10 to 30 vol. %, from the viewpoint of performing high-efficiency oxidation of carbon. The temperature of the heat treatment in the fifth step (A) is 200 to 500° C., preferably 250 to 400° C. With a heating temperature in the fifth step (A) in the range, the remaining carbon can be oxidized at high efficiency. The time period for the heat treatment in the fifth step (A) is not critical in the method for producing a lithium cobalt phosphate of the present invention. As the time period for the heat treatment in the fifth step increases, the amount of carbon contained in the lithium cobalt phosphate decreases. In the fifth step (A), it is preferable that the heat treatment be performed under appropriate conditions set in advance, such that the carbon content is controlled to a desired value.

The fifth step (B) comprises mixing the lithium cobalt phosphate obtained in the step 4 with a conductive carbon material source that is thermally decomposed to precipitate carbon (hereinafter, also simply referred to as "conductive carbon material source") to obtain a mixture of the lithium cobalt phosphate and the conductive carbon material source, and then heat-treating the mixture for thermal decomposition of the conductive carbon material source to obtain a lithium cobalt phosphate-carbon composite.

As the conductive carbon material source, a material that is thermally decomposed by heat treatment in at least the fifth step (B) to precipitate carbon is used. The conductive carbon material source is a component that imparts conductivity to a lithium cobalt phosphate. A composite is made from conductive carbon and the lithium cobalt phosphate, so that a lithium secondary battery including the lithium cobalt phosphate-carbon composite as a positive electrode active material is expected to have improved discharge capacity and cycle characteristics (refer to, for example, Japanese translation of PCT International Application Publication No. 2014-514712 and Japanese Patent Laid-Open No. 2008-117749).

Examples of the conductive carbon material source include coal tar pitch ranging from soft pitch to hard pitch; coal-based heavy oil such as dry-distilled liquefied oil, and petroleum-based heavy oil such as directly distilled heavy oil of normal-pressure residual oil and reduced-pressure residual oil, and decomposition-based heavy oil such as ethylene tar by-produced during thermal decomposition of crude oil and naphtha; aromatic hydrocarbons such as acenaphthylene, decacyclene, anthracene, and phenanthrene; polyphenylenes such as phenazine, biphenyl, and terphenyl; polyvinyl chloride; water-soluble polymers such as polyvinyl alcohol, polyvinyl butyral and polyethylene glycol, and insolubilized products thereof; nitrogen-containing polyacrylonitrile; organic polymers such as polypyrrole; organic polymers such as sulfur-containing polythiophene and polystyrene; natural polymers such as saccharides including glucose, fructose, lactose, maltose and sucrose; thermoplastic resins such as polyphenylene sulfide and polyphenylene oxide; and thermosetting resins such as phenol-formaldehyde resin and imide resin. Among these, saccharides are preferred from the viewpoint of industrial availability at low cost and capability of improving the discharge capacity and cycle characteristics of a lithium secondary battery having the lithium cobalt phosphate-carbon composite finally obtained as a positive electrode active material.

It is preferable that the conductive carbon material source be added at a mixing ratio of the conductive carbon material source, i.e., carbon atoms in the conductive carbon material source relative to the lithium cobalt phosphate, of 0.1 to 20.0 mass %, preferably 0.5 to 15.0 mass %, from the viewpoint of improving the discharge capacity and cycle characteristics of a lithium secondary battery having the lithium cobalt phosphate-carbon composite as a positive electrode active material.

In the fifth step (B), the lithium cobalt phosphate and the conductive carbon material source may be mixed in a dry process or a wet process.

In the fifth step (B), as a method of performing the mixing treatment in a dry process, it is preferable that the mixing treatment be performed by a mechanical means to obtain a uniform mixture. The apparatus used for dry mixing is not particularly limited as long as a uniform mixture can be obtained. Examples thereof include a high-speed mixer, a super mixer, a turbosphere mixer, an Eirich mixer, a Henschel mixer, a Nauta mixer, a ribbon blender, a V-type mixer, a conical blender, a jet mill, a Cosmomizer, a paint shaker, a bead mill, and a ball mill. For use in a laboratory, a household mixer is sufficient.

In the fifth step (B), examples of the method for performing the mixing treatment in a wet process include a method including adding a lithium cobalt phosphate and a conductive carbon material source to water solvent at a solid content of 10 to 80 mass %, preferably 20 to 70 mass %, mixing the mixture by a mechanical means to prepare a slurry, and then drying the slurry while standing still or by spray-drying to obtain a mixture of a lithium cobalt phosphate and a conductive carbon material source.

The apparatus used for wet mixing is not particularly limited as long as a uniform slurry can be obtained, and examples thereof include a stirrer, a stirrer with a stirring blade, a triple roll mill, a ball mill, a dispersion mill, a homogenizer, a vibration mill, a sand grinding mill, an attritor, and a strong stirrer. The wet mixing treatment is not limited to the mixing treatment by the mechanical means described above. Incidentally, in the wet mixing, a surfactant may be added to the slurry to perform the mixing treatment.

Next, the mixture of the lithium cobalt phosphate and the conductive carbon material source prepared as described above is subjected to heat treatment. The heat treatment needs to be performed at a temperature at which the conductive carbon material source is thermally decomposed to precipitate carbon, and the heating temperature is 180 to 900° C., preferably 210 to 800° C. With a heating temperature of the heating treatment in the range, carbon can uniformly cover the particle surface without aggregation. The heating time of the heat treatment is 0.2 hours or more, preferably 0.5 to 5 hours. It is preferable that the atmosphere of the heat treatment be an inert gas atmosphere from the viewpoint of suppressing oxidation of carbon. Also, in the heat treatment in the method for producing a lithium cobalt phosphate of the present invention, it is preferable that the conductive carbon material source is melted by heating once to equal to or more than the melting point of the conductive carbon material source for use, and then heat-treated in the range to cause precipitation of carbon from the conductive carbon material source from the viewpoint that the particle surface can be uniformly coated with carbon.

The lithium cobalt phosphate and the lithium cobalt phosphate-carbon composite thus obtained by the production method of the present invention are single-phase lithium cobalt phosphates in X-ray diffraction analysis, having an average particle size of preferably 5 μm or less, particularly preferably 0.05 to 2 μm, determined by SEM observation, and a BET specific surface area of preferably 0.1 $m^2/g$ or more, particularly preferably 0.3 to 15 $m^2/g$. Further, the lithium cobalt phosphate-carbon composite obtained by the production method of the present invention is preferably such that the surface of lithium cobalt phosphate particles is uniformly coated with carbon. The carbon atom content in the lithium cobalt phosphate-carbon composite is preferably from 0.1 to 20 mass %, particularly preferably from 0.5 to 15 mass %.

The lithium cobalt phosphate and lithium cobalt phosphate-carbon composite by the production method of the present invention are suitably used as a positive electrode material for lithium secondary batteries, all-solid-state batteries, etc.

EXAMPLES

Hereinafter, the present invention will be described in detail with reference to Examples, though the present invention is not limited to these Examples.

Example 1

<First Step>
To 11 L of pure water, 1604.5 g of oxalic acid dihydrate was added at room temperature (25° C.), and the mixture was stirred for 30 minutes using a three-one motor stirrer. To the mixture, 228 g of a dispersant (ammonium polycarboxylate) was added. Then, 1200 g of cobalt hydroxide was added and stirred for 30 minutes. Next, 1461.2 g of 85 mass % phosphoric acid was added and stirred for 30 minutes. Next, 534.4 g of lithium hydroxide monohydrate was added and stirred for 1 hour to obtain an aqueous raw material slurry.

<Second Step>
Next, the aqueous raw material slurry was supplied to a media-stirring type bead mill charged with zirconia beads having a diameter of 0.5 mm while stirring, and mixed for 3 hours, so that wet pulverization was performed. The average particle diameter of the solid in the slurry after wet pulverization determined by a laser scattering/diffraction was 0.5 μm.

<Third Step>
Subsequently, the slurry was supplied to a spray dryer having a hot air inlet set to a temperature of 220° C. at a supply rate of 2.4 L/h to obtain a reaction precursor. Only a small amount of components adhered to the inside of the spray dryer, and the collection rate was 97%. The resulting reaction precursor was identified to be a mixture of $Co(C_2O_4)(H_2O)_2$, $Co(HCOO)_2(H_2O)_2$ and $Li(H_2PO_4)$ by X-ray diffraction analysis. The X-ray diffraction diagram of the reaction precursor is shown in FIG. 1.

<Fourth Step>
Next, the resulting reaction precursor was fired at 425° C. for 2 hours in an air atmosphere to obtain a fired product.

The resulting fired product was analyzed by X-ray diffraction, and the fired product was identified to be a single-phase $LiCoPO_4$. The X-ray diffraction diagram of the fired product is shown in FIG. 2.

Example 2

A fired product was obtained in the same manner as in Example 1 except that in the fourth step, the firing was performed at 550° C. for 2 hours in an air atmosphere.

The resulting fired product was analyzed by X-ray diffraction, and the fired product was identified to be a single-phase $LiCoPO_4$. The X-ray diffraction diagram of the fired product is shown in FIG. 3.

Example 3

A fired product was obtained in the same manner as in Example 1 except that in the fourth step, the firing was performed at 550° C. for 2 hours in a nitrogen atmosphere.

The resulting fired product was analyzed by X-ray diffraction, and the fired product was identified to be a single-phase $LiCoPO_4$.

Example 4

A fired product was obtained in the same manner as in Example 1 except that in the fourth step, the firing was performed at 760° C. for 2 hours in an air atmosphere.

The resulting fired product was analyzed by X-ray diffraction, and the fired product was identified to be a single-phase LiCoPO$_4$.

Comparative Example 1

To 11 L of pure water, 1200 g of cobalt hydroxide was added at room temperature (25° C.), and the mixture was stirred for 30 minutes using a three-one motor stirrer. To the mixture, 228 g of a dispersant (ammonium polycarboxylate) was added. When 1461.2 g of 85 mass % phosphoric acid was subsequently added thereto, a purple cake was formed to make stirring impossible, so that subsequent steps were unable to be performed. The resulting solid was identified to be Co$_3$(PO$_4$)$_2$·8H$_2$O by X-ray diffraction analysis (refer to FIG. 4).

Comparative Example 2

To 1 L of pure water, 120 g of cobalt tetroxide was added at room temperature (25° C.), and the mixture was stirred for 30 minutes using a three-one motor stirrer. To the mixture, 22.8 g of a dispersant (ammonium polycarboxylate) was added. Next, 172.9 g of 85 mass % phosphoric acid was added and stirred for 30 minutes. Next, 63.2 g of lithium hydroxide monohydrate was added and stirred for 1 hour to obtain a slurry.

Subsequently, the slurry was supplied to a spray dryer having a hot air inlet set to a temperature of 220° C. at a supply rate of 2.4 L/h to obtain a reaction precursor. A large amount of components adhered to the inside of the spray dryer, and the collection rate was 37%. The resulting dry product was identified to be a mixture of Co$_3$O$_4$ and Li(H$_2$PO$_4$) by X-ray diffraction analysis (refer to FIG. 5).

Next, the resulting reaction precursor was fired at 425° C. for 2 hours in an air atmosphere to obtain a black fired product.

The resulting fired product was identified to be a mixture of LiCoPO$_4$, Co$_{2.75}$O$_4$ and Li(PO$_3$) by X-ray diffraction analysis (refer to FIG. 6).

TABLE 1

| | Molar ratio of raw material charged in first step | | | Firing condition in fourth step | | |
|---|---|---|---|---|---|---|
| | Li/P | Co/P | C/Co | Firing temperature (° C.) | Firing time (h) | Firing atmosphere |
| Example 1 | 1.0 | 1.0 | 2.0 | 425 | 2 | Air atmosphere |
| Example 2 | 1.0 | 1.0 | 2.0 | 550 | 2 | Air atmosphere |
| Example 3 | 1.0 | 1.0 | 2.0 | 550 | 2 | Nitrogen atmosphere |
| Example 4 | 1.0 | 1.0 | 2.0 | 760 | 2 | Air atmosphere |
| Comparative Example 1 | — | 1.0 | — | — | — | Air atmosphere |
| Comparative Example 2 | 1.0 | 1.0 | — | 425 | 2 | Air atmosphere |

<Evaluation of Various Physical Properties>

The average particle size and the BET specific surface area of the lithium cobalt phosphates obtained in Examples were measured, and the results are shown in Table 2. The SEM photograph of the lithium cobalt phosphate obtained in Example 1 is shown in FIG. 7.

In the measurement of the average particle size, through observation with a scanning electron microscope at a magnification of 10000 times, the average value of 50 or more pieces of randomly selected particles was determined as the average particle size.

Example 5

(Fifth Step (B))

Mixing of 10 g of LiCoPO$_4$ obtained in Example 4 and 2 g of lactose was performed using a planetary centrifugal mixer at 100 rpm for 1 minute. The mixture was heat-treated at 220° C. for 2 hours in a nitrogen atmosphere, then heated to 700° C., and maintained for 4 hours to obtain a LiCoPO$_4$-carbon composite. Further, as a result of observation of the LiCoPO$_4$-carbon composite with SEM-EDX, it was confirmed that the particle surface of LiCoPO$_4$ was uniformly coated with carbon. The carbon content was 3 mass % by measurement with TOC.

Example 6

A fired product was obtained in the same manner as in Example 2, except that in the second step, after the aqueous raw material slurry was pulverized by a media stirring type bead mill, 142 g of aluminum nitrate nanohydrate was added to the slurry in the media stirring type bead mill, and the slurry was stirred by the media stirring type bead mill to obtain a slurry to be supplied to the third step.

Through X-ray diffraction analysis of the resulting fired product, the fired product was identified to be a lithium cobalt phosphate containing Al at a molar ratio Al/Co of 0.03, with no different phase observed (FIG. 8).

TABLE 2

| | Average particle size (μm) | BET specific surface area (m$^2$/g) |
|---|---|---|
| Example 1 | 0.17 | 9.3 |
| Example 2 | 0.25 | 6.4 |
| Example 3 | 0.06 | 29.6 |
| Example 4 | 1.77 | 1.3 |
| Example 5 | 1.82 | 21.9 |
| Example 6 | 0.10 | 17.2 |

The invention claimed is:
1. A method for producing a lithium cobalt phosphate represented by the following general formula (1):

$$\text{Li}_x\text{Co}_{1-y}\text{M}_y\text{PO}_4 \quad (1)$$

wherein 0.8≤x≤1.2 and 0≤y≤0.5, and M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy, and Ho;

the method comprising:
a first step of adding an organic acid and cobalt hydroxide to a water solvent and reacting them to obtain a slurry (A) containing an organic acid salt of cobalt, and then adding phosphoric acid and lithium hydroxide to the slurry (A) containing the organic acid salt of cobalt to prepare an aqueous raw material slurry (1);
a second step of wet-pulverizing the aqueous raw material slurry (1) with a media mill to obtain a slurry (2) containing a pulverized product of raw materials;
a third step of spray-drying the slurry (2) containing the pulverized product of raw materials to obtain a reaction precursor; and
a fourth step of firing the reaction precursor.

2. The method for producing a lithium cobalt phosphate according to claim 1, further comprising adding an M source to the aqueous raw material slurry (1) in the first step or the slurry (2) containing the pulverized product of raw materials in the second step, wherein M represents one or two or more metal elements selected from the group consisting of Mg, Zn, Cu, Fe, Cr, Mn, Ni, Al, B, Na, K, F, Cl, Br, I, Ca, Sr, Ba, Ti, Zr, Hf, Nb, Ta, Y, Yb, Si, S, Mo, W, V, Bi, Te, Pb, Ag, Cd, In, Sn, Sb, Ga, Ge, La, Ce, Nd, Sm, Eu, Tb, Dy and Ho.

3. The method for producing a lithium cobalt phosphate according to claim 1, wherein the solid in the slurry (2) containing the pulverized product of raw materials has an average particle size of 1.5 µm or less.

4. The method for producing a lithium cobalt phosphate according to claim 1, wherein the organic acid is a carboxylic acid.

5. The method for producing a lithium cobalt phosphate according to claim 1, wherein the organic acid is oxalic acid.

6. The method for producing a lithium cobalt phosphate according to claim 1, wherein the reaction precursor contains an organic acid salt of cobalt and a phosphate of lithium.

7. The method for producing a lithium cobalt phosphate according to claim 1, wherein a firing temperature is 380 to 1100° C.

8. The method for producing a lithium cobalt phosphate according to claim 1, further comprising a fifth step (A) of heat-treating the lithium cobalt phosphate obtained by the fourth step.

9. A method for producing a lithium cobalt phosphate-carbon composite comprising a fifth step (B) comprising mixing the lithium cobalt phosphate obtained by the method for producing a lithium cobalt phosphate according claim 1 with a conductive carbon material source that is thermally decomposed to precipitate carbon to obtain a mixture of the lithium cobalt phosphate and the conductive carbon material source, and then heat-treating the mixture for thermal decomposition of the conductive carbon material source to obtain a lithium cobalt phosphate-carbon composite.

10. The method for producing a lithium cobalt phosphate-carbon composite according to claim 9, wherein a heat treatment temperature of the heat-treatment in the fifth step (B) is 180 to 900° C.

* * * * *